US006745099B2

(12) United States Patent
Hoffman

(10) Patent No.: US 6,745,099 B2
(45) Date of Patent: Jun. 1, 2004

(54) SYSTEM AND METHOD FOR PROVIDING TRIM OPTIMIZATION THROUGH THE POOLING OF INFORMATION RELATED TO MANUFACTURING CONFIGURATIONS AND MARKET DEMANDS

(76) Inventor: Roger P. Hoffman, 2780 Queen Ann Ct., Green Bay, WI (US) 54303

( * ) Notice: Subject to any disclaimer, the term of this patent is extended or adjusted under 35 U.S.C. 154(b) by 0 days.

(21) Appl. No.: 09/860,187

(22) Filed: May 17, 2001

(65) Prior Publication Data
US 2002/0022904 A1 Feb. 21, 2002

Related U.S. Application Data
(60) Provisional application No. 60/225,583, filed on Aug. 16, 2000.

(51) Int. Cl.⁷ ............................ G06F 19/00; G05B 13/02
(52) U.S. Cl. ........................ 700/171; 700/173; 700/28; 700/122; 700/134

(58) Field of Search ..................... 700/28–173; 707/200

(56) References Cited
U.S. PATENT DOCUMENTS

| 5,093,794 | A | * | 3/1992 | Howie et al. ................ 700/100 |
| 5,126,932 | A | * | 6/1992 | Wolfson et al. .............. 700/100 |
| 5,291,394 | A | * | 3/1994 | Chapman .................... 700/100 |
| 5,815,398 | A | * | 9/1998 | Dighe et al. ................ 700/171 |

* cited by examiner

Primary Examiner—Leo Picard
Assistant Examiner—W. Russell Swindell
(74) Attorney, Agent, or Firm—Philip M. Weiss; Weiss & Weiss

(57) ABSTRACT

A system and method for trim optimization comprising a database. The database comprises information concerning widths of specific machines of manufacturers, widths of the orders and remaining space required to be filled on the machines at a given time. The database further comprises specifications of products to be manufactured on the specific machines and specifications of the orders.

9 Claims, No Drawings

SYSTEM AND METHOD FOR PROVIDING TRIM OPTIMIZATION THROUGH THE POOLING OF INFORMATION RELATED TO MANUFACTURING CONFIGURATIONS AND MARKET DEMANDS

This application claims the benefit of Provisional application Ser. No. 60/225,583, filed Aug. 16, 2000.

FIELD OF THE INVENTION

The present invention relates to a method and system for optimizing trim from a sheet product.

BACKGROUND OF THE INVENTION

One of the challenges of web based manufacturers such as: sheet steel; sheet aluminum, paper and paperboard is to fully utilize the width of their primary manufacturing equipment which is typically wider than the orders they receive. By combining various orders from people who convert their primary products, less trim is wasted.

As an example, if a manufacturer has a machine that is 4 meters in width, the manufacturer would, to the extent possible, prefer to sell his product (or transfer to his converting divisions if they are captive), to customers that would use the greatest amount of this 4-meter width. If however, the only options available to the manufacturer were customers (or internal converters) that were 1.5 meters in width, then the manufacturer would achieve only 75% ((1.5+1.5)/4) of the usable width of his machine.

In many industries there are no standard widths, but a wide variety of widths based on the needs of the final user of the converted product, and also based on a variety of widths of converting equipment.

Therefore in theory, manufacturers can achieve very high trim efficiencies (ratio of sold width to maximum available width) by pooling orders that fit together. In the aforementioned example, if there existed a demand for 1 meter wide material, then it would be possible to achieve a very high trim efficiency.

Unfortunately, it would be very unlikely that the demand for 1-meter wide material would be exactly matched to the needs of the trim scheduler. So the dilemma for the scheduler is to fully utilize the entire width of the manufacturer's machine to try to generate demand with more favorable pricing, or through searching for options by making phone calls, sending faxes, and so forth.

If the process of finding trimmable widths requires excessive time, the poorer trims get scheduled and run, and the loss of productive utilization incurred. Similarly it is possible, in a tight market with a great deal of demand, to accumulate orders until there is an acceptable pool of trims that fit together. The consequence of this is that there is then a big variation in response time—some customers getting a very rapid response if their sizes were needed—and others experiencing longer periods for processing of orders.

To help alleviate some of these concerns, competitors that utilize different widths will do "trades" with each other so that the needed sizes can get interchanged between them. This procedure, while useful, is done based on historical usage of various widths, which are not always the same as current usages.

It is current practice to maximize trim with software that resides at each producer. The trim program looks at the pool of orders and arranges the orders to get the best utilization of each manufacturer's machines. This, however, does not allow a customer to realize the trim demands of each manufacturer, nor does it allow a manufacturer to realize the trim demands of persons whom are not current customers of the manufacturer.

SUMMARY OF THE INVENTION

The present invention relates to a system for trim optimization comprising; a database. The database comprises widths of specific machines of manufacturers; width of orders and remaining space required to be filled on the specific machines at a given time. The database further comprises specifications of products to be manufactured on the specific machines and specifications of the orders. It is an object of the present invention for the system to allow a user to search the database to find orders that fill remaining trim of the machine. It is an object of the present invention to match orders to remaining space to be filled on a specific machine. It is an object of the present invention to remove machines which have had their spaced filled from the database for the period of time that the machines do not require further orders to complete their space.

The present invention relates to a process for trim optimization comprising; entering a database comprising information about width of machines of current manufacturers, width of present orders and remaining space that is required to be filled on a specific machine. A user then views this information and chooses a specific machine to place their order. It is an object of the present invention to view this information in real time. It is an object of the present invention to view the information in real time and with as much visibility as possible.

The present invention relates to a process for trim optimization comprising; providing a pooling network wherein each manufacturer inputs their untrimmed orders into a system. The system aggregates and retains the orders. A user inputs the width of each manufacturer's machines into said system. The system provides information regarding what sizes are in excess or are needed to trim the machines. It is an object of the present invention to provide information regarding price. It is an object of the present invention to store trim requirements of users.

It is an object of the present invention to ascertain what sizes are in excess or are needed to trim the machines. The sizes that are not in demand could be more favorably priced to help create the necessary demand.

It is an object of the present invention to provide a system which allows a user who is interested in finding a machine who can accommodate the width of their product in a certain amount of time at a better price. It is an object of the present invention to store the trim requirements of the users so that a manufacturer can be secured. It is an object of the present invention to assist a user in getting the best price from a manufacturer when that length of trim is required.

It is an object of the present invention to allow a manufacturer to search the database of the present invention and find the best consumer which fills the remaining trim of a machine. The manufacturer can also advertise better prices if a user is willing to fill the remaining trim on a machine.

DETAILED DESCRIPTION OF THE INVENTION

In an example of the present invention a number of manufacturers input into the database of the present invention the width of their machines.

Manufacturer A 4.5 meters
Manufacturer B 4.0 meters
Manufacturer C 5.0 meters

These same manufacturers input into the system of the present invention the amount of extra trim space that they have for a certain time period and specifications for the products that are being made at that time.

Manufacturer A 1.0 meters for August
Manufacturer B 0.8 meters for August
Manufacturer C 1.5 meters for August Customers input their requirements into the database of the present invention.

Customer A 0.5 meters for August
Customer B 1.2 meters for August
Customer C 1.0 meters for August The system of the present invention matches the appropriate customers with the appropriate manufacturer and informs each of them or any of them of the matches. Based on the amount of trim which is satisfied. An appropriate price can be offered. The above example assumes that the specifications for each of the orders and each of the machines is the same.

In a preferred embodiment, the system of the present invention e-mails a user when a match is found for their trim.

What is claimed is:

1. A system for trim optimization comprising:
    a database;
    said database comprising widths of specific machines of manufacturers;
    width of orders and remaining space required to be filled on said specific machines at a given time;
    said database further comprises specifications of products to be manufactured on said specific machines and specifications of said orders.

2. The system of claim 1 wherein said database can be searched to find orders that fill remaining trim of said machine.

3. The system of claim 1 wherein orders are matched to said remaining space to be filled on a specific machine.

4. The system of claim 3 wherein when said remaining space is filled, said system removes said machine from said database for said given time.

5. A process for trim optimization comprising;
    entering a database comprising information about width of machines of manufacturers, width of orders and remaining space that is required to be filled on said machine;
    viewing said width of machines of current manufacturers, width of orders and remaining space that is required to be filled on said machine; and
    choosing a machine.

6. The process of claim 5 further comprising;
    viewing information about said width of machines of current manufacturers, said width of orders and said remaining space that is required to be filled on said machine in real time.

7. A process for trim optimization comprising;
    providing a pooling network wherein each manufacturer inputs their untrimmed orders into a system;
    aggregating and retaining said orders;
    inputting width of each manufacturer's machines into said system;
    providing information regarding what sizes are in excess or are needed to trim said machines.

8. The process of claim 7 further comprising:
    providing information regarding price.

9. The process of claim 7 further comprising;
    storing trim requirements of users.

* * * * *